US007092363B1

(12) United States Patent
Majidi-Ahy (10) Patent No.: US 7,092,363 B1
(45) Date of Patent: *Aug. 15, 2006

(54) HIGH-CAPACITY SCALABLE INTEGRATED WIRELESS BACKHAUL FOR BROADBAND ACCESS NETWORKS

(75) Inventor: Reza Majidi-Ahy, Los Altos, CA (US)

(73) Assignee: Aperto Networks, Inc., Milpitas, CA (US)

( * ) Notice: Subject to any disclaimer, the term of this patent is extended or adjusted under 35 U.S.C. 154(b) by 952 days.

This patent is subject to a terminal disclaimer.

(21) Appl. No.: 09/604,784

(22) Filed: Jun. 26, 2000

(51) Int. Cl.
*H04Q 7/20* (2006.01)
(52) U.S. Cl. .................. 370/252; 370/338; 370/349; 370/465; 455/422.1; 455/446; 709/228; 709/249
(58) Field of Classification Search ............... 370/252, 370/253, 338, 349, 465, 466, 467, 469; 455/422, 455/446, 448, 449, 422.1; 709/227, 228, 709/229, 230, 249
See application file for complete search history.

(56) References Cited

U.S. PATENT DOCUMENTS 5,481,735 A * 1/1996 Mortensen et al. ......... 709/246

(Continued)

FOREIGN PATENT DOCUMENTS

DE  197 28 469 A1  7/1999

(Continued)

OTHER PUBLICATIONS

Seyhan Civanlar and Bharat T. Doshi. "Self-Healing in Wideband Packet Networks". IEEE Network vol. 4 (1990) Jan., No. 1, New York, pp. 35-39. XP 000113853.

(Continued)

*Primary Examiner*—Steven Nguyen
*Assistant Examiner*—Roberta Shand
(74) *Attorney, Agent, or Firm*—Swernofsky Law Group PC (57) ABSTRACT

The invention provides a method and system for adaptive point-to-point communication between a wireless communication system and a non-wireless backhaul communication system. The wireless physical layer and the wireless media-access-control (MAC) layer collectively include a set of parameters, which are adaptively modified by base station controllers in multiple cells of the wireless communication system for intercommunication among those multiple cells. The IP layer and QoS (quality of service) parameters for communication between a selected base station controller and the non-wireless backhaul communication system collectively include a second set of parameters, which are adaptively modified by the selected base station controller for intercommunication between that selected base station controller and the non-wireless backhaul communication system. Wireless communication among multiple cells includes adaptive modification of parameters for the physical layer and the MAC layer, so as to optimize intercell communication without excessive interference with intracell communication. Thus, a first base station controller (selected for its relatively central communication position) adjusts communication with each neighbor base station controller individually and adaptively in response to changes in characteristics of communication, including physical characteristics, amount of communication traffic, and nature of application for the communication traffic. The first base station controller accounts for characteristics of communication for both intracell and intercell communication, including the possibility of interference between intracell and intercell communication. The combination of wireless communication and non-wireless communication over the entire channel between multiple customer premises equipment and at least one router in the non-wireless communication backhaul network includes adaptive modification of parameters for the IP layer and QoS, so as to optimize backhaul communication between customer premises equipment and the backhaul network.

28 Claims, 4 Drawing Sheets

U.S. PATENT DOCUMENTS

| | | | |
|---|---|---|---|
| 5,657,325 A | 8/1997 | Lou et al. | |
| 5,852,631 A * | 12/1998 | Scott | 375/222 |
| 6,252,914 B1 * | 6/2001 | Yamamoto | 375/296 |
| 6,414,950 B1 | 7/2002 | Rai et al. | |
| 6,519,248 B1 * | 2/2003 | Valko | 370/352 |
| 6,553,568 B1 * | 4/2003 | Fijolek et al. | 725/111 |
| 6,571,096 B1 * | 5/2003 | Plunkett | 455/436 |
| 6,625,153 B1 * | 9/2003 | Liu | 370/395 |
| 2003/0008632 A1 * | 1/2003 | Menon et al. | 455/403 |

FOREIGN PATENT DOCUMENTS

| | | |
|---|---|---|
| EP | 1 009 182 A2 | 6/2000 |
| WO | WO 97/17768 A1 | 5/1997 |
| WO | WO 98/59523 A2 | 12/1998 |
| WO | WO 98/59523 A3 | 12/1998 |
| WO | WO 99/01959 A2 | 1/1999 |
| WO | WO 99/14975 A2 | 3/1999 |
| WO | WO 99/14975 A3 | 3/1999 |
| WO | WO 99/23844 A2 | 5/1999 |
| WO | WO 99/23844 A3 | 5/1999 |
| WO | WO 99/44341 A1 | 9/1999 |
| WO | WO 01/50633 A1 | 7/2001 |
| WO | WO 01/50669 A1 | 7/2001 |
| WO | WO 02/05493 A2 | 1/2002 |

OTHER PUBLICATIONS

Bakshi, B., P. Krishna, N.H. Vaidya, D.K. Pradhan, "Improving Performance of TCP over Wireless Networks." Distributed Computing Systems, 1997, Proceedings of the 17$^{th}$ International Conference on Baltimore, MD, USA, May 27-30, 1997, pp. 365-373, IEEE Computer Society, Los Alamitos, CA.

Mouly, "Radio Resource Management," GSM System for Mobile Communications, 1993, pp. 308-430, Lassay-Les-Chateaux, Europe Media, France.

* cited by examiner

HIGH-CAPACITY SCALABLE INTEGRATED WIRELESS BACKHAUL FOR BROADBAND ACCESS NETWORKS

BACKGROUND OF THE INVENTION

1. Field of the Invention

This invention relates to wireless communication systems, such as those including integrated backhaul.

2. Related Art

Wireless communication systems include sending information between a sender and a receiver using a wireless communication link. In wireless communication, the sender modulates information onto a wireless communication channel (such as a frequency band reserved for wireless communication between the sender and the receiver), and the receiver demodulates that information from the wireless communication channel (so as to recover the original information). Known wireless communication systems often use a cell structure, in which within each cell a BSC (base station controller) communicate with CPE (customer premises equipment). This provides the features that (a) communication can independently be controlled within each cell, and (b) wireless communication resources, such as frequencies, can be used in multiple cells when those cells are sufficiently distant to prevent substantial interference.

One problem with known systems is the need to provide integrated backhaul connectivity between the wireless communication system and a non-wireless communication system. For example, such non-wireless communication systems might include a wire line or fiber communication system including routers and the Internet. Such backhaul connectivity might should advantageously include inter-cell communication, as well as communication between selected cells (more specifically, the base station controllers in selected cells) and the non-wireless communication system. However, attempts to integrate backhaul connectivity with known systems would suffer from similar draw-backs to those that are common to internal communication within wireless communication systems; these would include drawbacks described in the Incorporated Disclosures (see "Related Applications" below).

More specifically, the physical characteristics of the communication link between a first cell and a second cell can change substantially over relatively short periods of time, even though the physical location of the base station controllers for those cells is not substantially altered. This is particularly so for interference, such as co-channel interference (CCI), and for multipath effects, such as reflections resulting in intrasymbol interference, intersymbol interference, and fading. There are multiple such characteristics of the communication link, each of which can change over time independently of each other. As a result, selection of a single set of such physical characteristics, even when physical conditions of the lines of sight between the first cell and the second cell are known, can result in relatively ineffective or inefficient communication between cells.

Accordingly, it would be advantageous to provide a technique for wireless communication including an integrated backhaul capability that is not subject to drawbacks of the known art. For one example, it would be advantageous to provide an adaptive point to point, or point to point-to-point, connection between selected cells of a wireless commutation system and selected elements of a non-wireless communication system. For a second example, it would be advantageous to provide an adaptive point-to-point, or point to point-to-point, connection among multiple cells in a wireless communication system.

SUMMARY OF THE INVENTION

The invention provides a method and system for adaptive point-to-point, or point to point-to-point, communication between a wireless communication system and a non-wireless backhaul communication system. The invention also provides a method and system for adaptive point-to-point, or point to point-to-point, communication among multiple cells in a wireless communication system.

The wireless communication system includes a set of parameters for the physical layer and the MAC layer for communication with the non-wireless backhaul communication system, similar to those parameters for communication within individual cells of the wireless communication system. In a first aspect of the invention, selected base station controllers modify those parameters to provide connectivity with the non-wireless communication system.

In a second aspect of the invention, the selected base station controllers modify those parameters to provide connectivity for intercommunication among multiple cells in the wireless condition system. Those parameters are modified, for example, to optimize intercell or intracell communication without excessive interference with (other) intracell communication.

The wireless communication system also includes a set of second parameters, for the IP layer and QoS (quality of service) administration of communication between the selected base station controller and the non-wireless backhaul communication system. The selected base station controller adaptively modifies this set of second parameters to provide connectivity with at least one router in the non-wireless backhaul communication system. In a preferred embodiment, those second parameters are adaptively modified in response to the entire channel between multiple customer premises equipment and the router. This allows the selected base station controller to optimize backhaul communication between customer premises equipment and the non-wireless backhaul communication system.

The invention provides an enabling technology for a wide variety of applications for communication, so as to obtain substantial advantages and capabilities that are novel and non-obvious in view of the known art. Examples described below primarily relate to a wireless communication system, but the invention is broadly applicable to many different types of communication in which characteristics of the communication link are subject to change.

DETAILED DESCRIPTION OF THE PREFERRED EMBODIMENT

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Applications

Inventions described herein can be used in conjunction with inventions described in the following documents.

- U.S. patent application Ser. No. 09/475,642, Express Mail Mailing No. EL 524 70 018 US, filed Dec. 30, 1999 in the name of Reza Ahy and Subir Varma, titled "Adaptive Link Layer for Point to Multipoint Communciations System"
- U.S. patent application Ser. No. 09/475,716, Express Mail Mailing No. EL 524 780 021 US, filed Dec. 30, 1999 in the name of Reza Ahy and Subir Varma, titled "Integrating Self-Optimizing Multi-Parameter and Multivariable Point to Multipoint Communication System"

and

- U.S. patent application Ser. No. 09/540,674, Express Mail Mailing No. EL 524 781 512 US, filed Mar. 31, 2000, in the name of Reza Ahy, titled "Robust Topology Wireless Communication Using Broadband Access Points".

Each of these documents is hereby incorporated by reference as if fully set forth herein. These documents are collectively referred to as the "Incorporated Disclosures".

Lexicography

The following terms refer or relate to aspects of the invention as described below. The descriptions of general meanings of these terms are not intended to be limiting, only illustrative.

- base station controller—in general, a device for performing coordination and control for a wireless communication cell. There is no particular requirement that the base station controller must be a single device; in alternative embodiments, the base station controller can include a portion of a single device, a combination of multiple devices, or some hybrid thereof.
- communication link—in general, an element for sending information from a sender to a recipient. Although in a preferred embodiment the communication links referred to are generally wireless line of sight point to point communication links, there is no particular requirement that they are so restricted.
- customer premises equipment—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.
- IP parameters—in general, a set of characteristics or parameters relating to an IP layer for a communication link.
- MAC parameters—in general, with reference to a wireless communication link, a set of characteristics or parameters relating to media access control of a communication link. For example, MAC parameters can include (a) a number of payload data bytes assigned per message, (b) a frequency of acknowledgement messages and a number of message retransmission attempts, (c) a fraction of the communication link allocated to downstream versus upstream communication, and the like.
- physical parameters—in general, with reference to a wireless communication link, a set of characteristics or parameters relating to physical transmission of information on a communication link. For example, physical characteristics can include (a) a symbol transmission rate, (b) a number of payload data bits assigned per symbol, (c) a number of error detection or correction bits assigned per symbol, and the like.
- QoS parameters—in general, a set of characteristics or parameters relating to QoS (quality of service) for a communication link.
- wireless communication system—in general, a communication system including at least one communication link that uses wireless communication techniques.
- wireless transport layer—in general, a set of protocols and protocol parameters for sending and receiving information using wireless transport. In a preferred embodiment, the wireless transport layer is part of a multilayer systems architecture, in which the wireless transport layer is built using a physical transport layer, and the wireless transport layer is used by a logical transport layer such as IP.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

The context of the invention is similar to that of the Incorporated Disclosures.

A system using adaptive point-to-point wireless communication between cells in a wireless communication system operates as part of a cellular wireless communication system. The cellular wireless communication system includes a communication model in which devices coupled to a network (such as a computer network) intercommunicate using message signals. In a preferred embodiment, these message signals include sequences of packets or cells, which have header information and which conform to the OSI model. In the OSI model, an application protocol (layer 5, such as FTP), uses a transport protocol (layer 4, such as TCP), which uses a network protocol (layer 3, such as IP), which uses a media access control (MAC) protocol (layer 2), which uses a physical transport technique (layer 1).

The system using adaptive point-to-point wireless communication is described herein with regard to layer 1 and layer 2, particularly as it applies to interactions between layer 1 and layer 2 and between those layers and layer 3. However, concepts and techniques of the invention are also applicable to other layers of the OSI model. For example, there might be cases where the type of application in the application layer (layer 5) is detected and responded to, so as to improve communication. Adapting those concepts and techniques to such other layers would not require undue experimentation or further invention, and is within the scope and spirit of the invention.

System Elements

Figure 1:
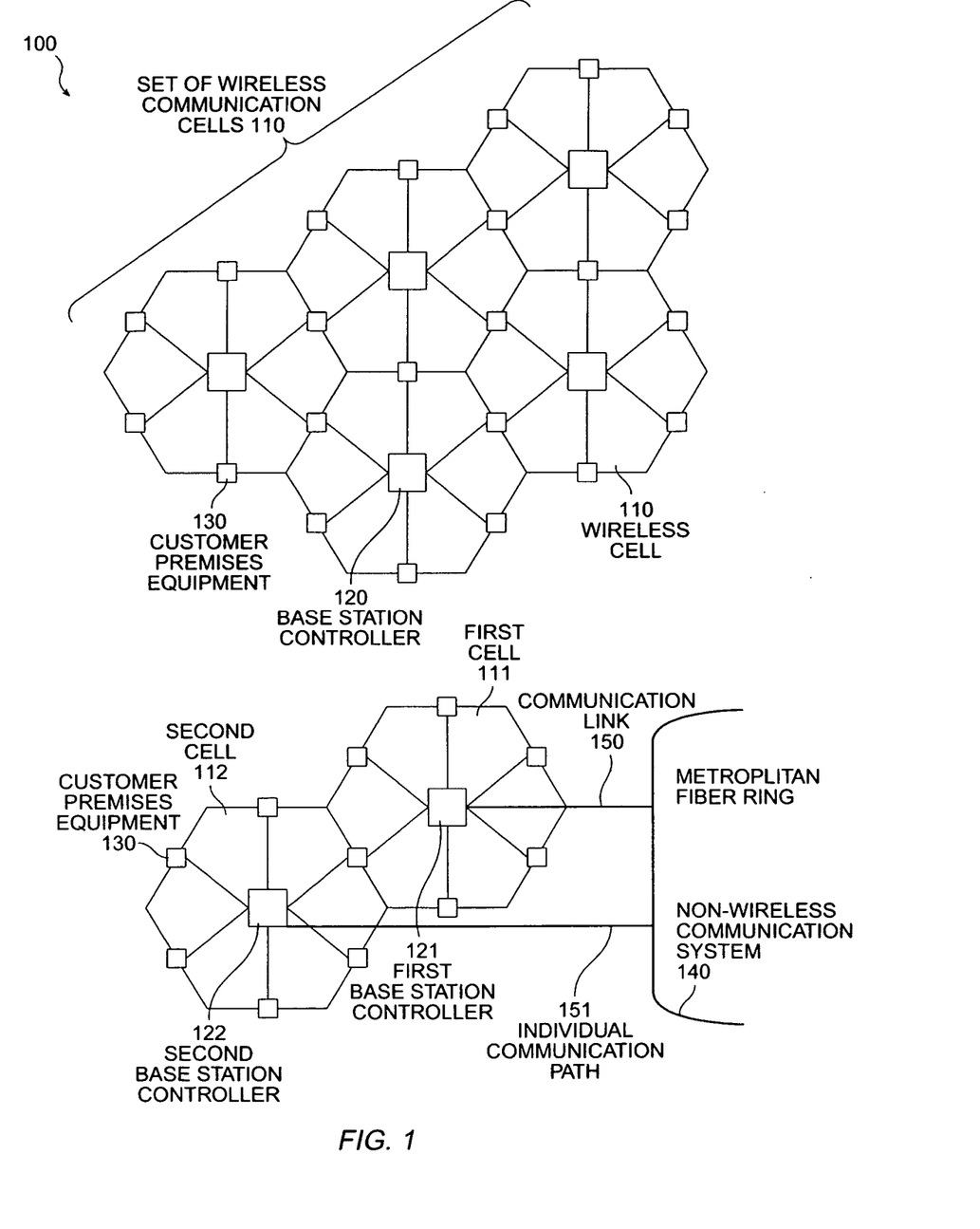
FIG. 1 shows a block diagram of a system including an integrated backhaul capability using adaptive communication in a wireless communication system.

FIG. 1 shows a block diagram of a system including an integrated backhaul capability using adaptive communication in a wireless communication system.

A system 100 includes a set of wireless communication cells 110. Each wireless communication cell 110 occupies a region of space and includes a base station controller 120 and one or more customer premises equipment 130.

Each wireless communication cell 110 includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

The wireless communication cells 110 include at least a first cell 111 and a second cell 112, in which the second cell 112 is disposed sufficiently near to the first cell 111 to allow wireless communication between the first cell 111 and the second cell 112. Specifically, a first base station controller 121 (in the first cell 111) and a second base station controller 122 (in the second cell 112) communicate using the methods and system 100 described herein.

In a preferred embodiment, the first cell 111 is located relatively centrally with regard to a set of such second cells 112. For example, as shown in the figure, the first cell 111 can be located in the center of a hexagon formed of such second cells 112.

The base station controller 120 includes a processor, program and data memory, mass storage, and one or more antennas for sending or receiving information using wireless communication techniques.

Similar to the base station controller 120, each customer premises equipment 130 includes a processor, program and data memory, mass storage, and one or more antennas for sending or receiving information using wireless communication techniques.

Communication among devices within the wireless communication cell 110 is conducted on one-to-one basis between each customer premises equipment 130 and the base station controller 120. Thus, the base station controller 120 communicates with each customer premises equipment 130, and each customer premises equipment 130 communicates with the base station controller 120. Customer premises equipment 130 do not communicate directly with other customer premises equipment 130.

Communication between the base station controller 120 and each customer premises equipment 130 is described in detail in the Incorporated Disclosures.

The system 100 also includes a non-wireless communication system 140, and a communication link 150 coupling the first base station controller 121 and the non-wireless communication system 140.

In a first preferred embodiment, the communication link 150 can include a wireless communication link, such as a wireless communication link between a base station controller 120 and customer premises equipment 130. In a second preferred embodiment, the communication link 150 can include a non-wireless communication link, such as an OC-3 communication link, another fiber communication link, or another type of wire line communication link. In alternative embodiments, the communication link 150 can include a combination of non-wireless communication sub-links and wireless communication sub-links, which operate in conjunction or in parallel so as two coupled the first base station controller 121 and the non-wireless communication system 140.

In alternative embodiments, the communication link 150 can include a plurality of separate individual communication paths 151, such as one or moreover, or some combination of, the following:

a first individual communication path 151 from a first selected base station controller 120 to the non-wireless communication system 140; and a second individual communication path 151 from a second selected base station controller 120 to the non-wireless communication system 140.

In a preferred embodiment, each of the first individual communication path 151 and the second individual communication path 151 include non-wireless (fiber-optic) communication links from a selected base station controller 120 to the non-wireless communication system 140. However, in alternative embodiments, the first individual communication path 151 or the second individual communication path 151 may include wireless communication links from one or more base station controllers 120 to the non-wireless communication system 140.

In a preferred embodiment, the non-wireless communication system 140 includes a fiber-optic network coupling the non-wireless communication system 140 to or from a router or switch. The router or switch is itself coupled to a computer communication network (such as an Internet, an intranet, an extranet, a virtual private network, or some other type of communication network).

Elements for Adaptive Point-to-Point Communication

The system performs adaptive control of point-to-point communication similarly to the technique described for adaptive control of point-to-multipoint communication in the Incorporated Disclosures.

The first base station controller 121 maintains a set of physical parameters and MAC parameters for each (nearby) second base station controller 122. In a preferred embodiment, control of each parameter by the first base station controller 121 is independent and individual with regard to each second base station controller 122. Thus for example, the first base station controller 121 determines power level and modulation type for each second base station controller 122 without regard to power level and modulation type for any other second base station controller 122. Similarly, the first base station controller 121 determines power level for a particular second base station controller 122 without regard for modulation type for that same second base station controller 122.

The various alternative embodiments for adaptive control of point-to-point communication are similar to the various alternative embodiments described in the Incorporated Disclosures for adaptive control of point-to-multipoint communication.

The system performs adaptive control of point-to-point communication between the first base station controller 121 and each (nearby) second base station controller 122. This achieves at least the following purposes:

- optimizing communication between the first base station controller 121 and each individual second base station controller 122, such as by minimizing CCI, fading, and multipath effects; and
- minimizing interference between intracell communication and intercell communication, such as by minimizing CCI and other forms of interference between intracell communication signals and intercell communication signals.

In a preferred embodiment, physical parameters and MAC parameters include the physical parameters described in the Incorporated Disclosures. These include: antenna selection, power level selection, channel selection, modulation type, symbol rate, error code type, and equalization parameters.

In a preferred embodiment, physical parameters and MAC parameters include the MAC parameters described in the Incorporated Disclosures. These include: message size, acknowledgment in the transmission, and TDD duty cycle.

Those skilled in the art would recognize, after perusal of this application, that physical parameters and MAC parameters selected by the first base station controller 120 for adaptive point-to-point communication with a particular nearby base station controller 120 in a nearby cell, need not be identical or even correlated with physical parameters and MAC parameters selected by the same first base station controller 120 for adaptive point-to-multipoint communication with customer premises equipment 130 in the same cell.

The first base station controller 120 maintains these physical parameters and MAC parameters, and adaptively modifies them with changing conditions on the communication link between the first base station controller 120 and nearby base station controllers 120. In a preferred embodiment, the first base station controller 120 uses a technique for maintenance and adaptive modification similar to that described with respect to the base station controller 120 and its communication links with customer premises equipment 130 in the Incorporated Disclosures.

Those skilled in the art would recognize, after perusal of this application, that adaptive control of point-to-point communication by the first base station controller 120 with regard to nearby the station controllers 120 need not use the same values or the same hysteresis parameters as adaptive control of point-to-multipoint communication by the base station controller 120 with regard to customer premises equipment 130. Thus for example, the hysteresis parameters shown in the Incorporated Disclosures might include a first set of values for adaptive control of point-to-point communication, and might include a second set of values for adaptive control of point to multipoint communication.

Access Points

Figure 2:
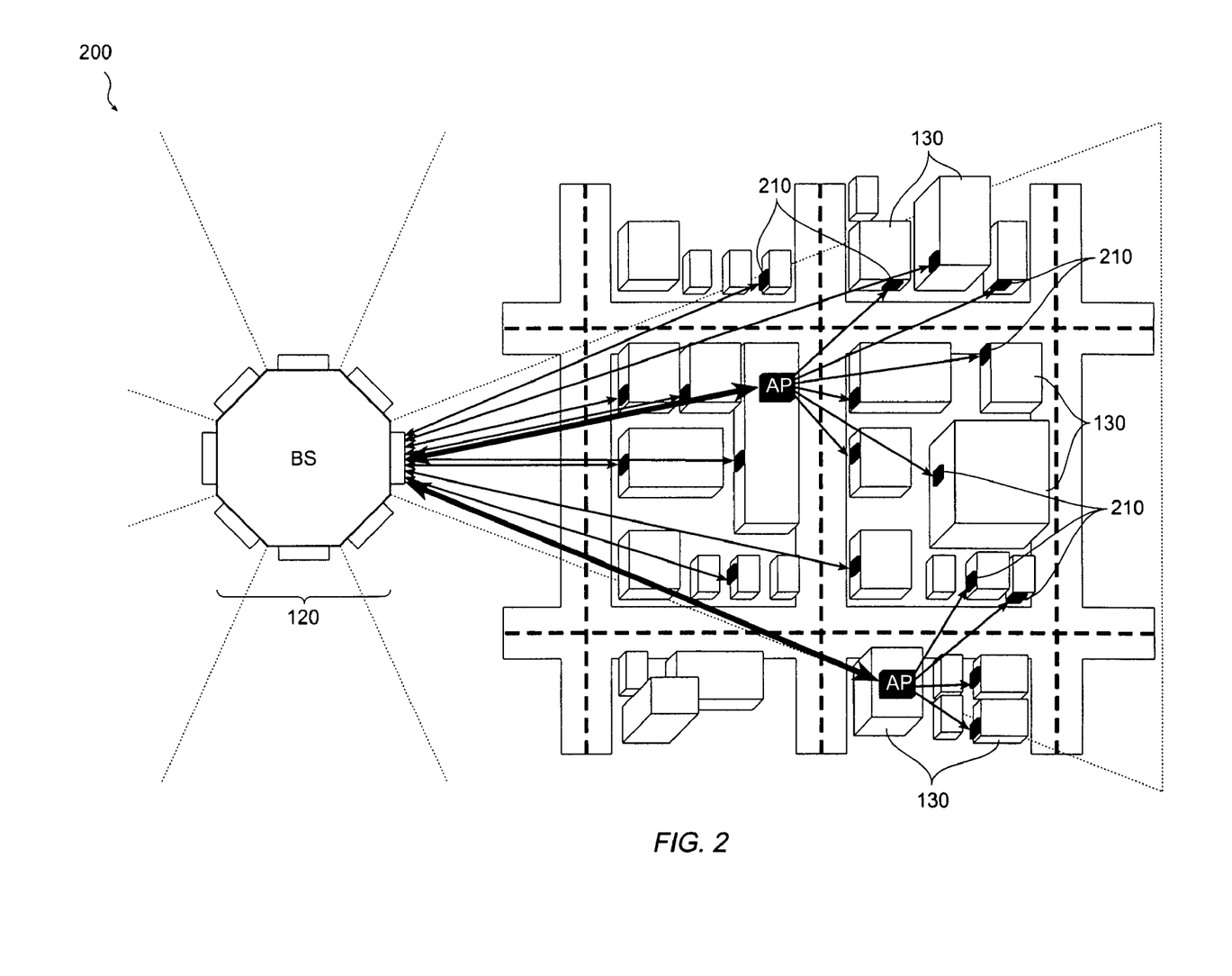
FIG. 2 shows a block diagram of a system including an integrated backhaul capability in a wireless communication system with access points.

FIG. 2 shows a block diagram of a system including an integrated backhaul capability in a wireless communication system with access points.

In a preferred embodiment, an individual base station controller 120 is coupled to a plurality of customer premises equipment 130 using a set of access points 210, as described in the Incorporated Disclosures. The access points 210, provides enhanced communication and enhanced connectivity between the base station controller 120 and customer premises equipment 130.

In addition to providing enhanced communication and enhanced connectivity, the access points 210 are integrated into the backhaul capability of the wireless communication system 100. Thus, communication between customer premises equipment 130 and the non-wireless communication system 140 can include connectivity (between a base station controller 120 and one or more customer premises equipment 130) provided by one or more access points 210. In addition to allowing a base station controller 120 to communicate with customer premises equipment 130, access points 210 also allow customer premises equipment 130 to communicate with non-wireless communication system 140, such as by means of one or more base station controllers 120.

Access Points in a Mesh Network

Figure 3:
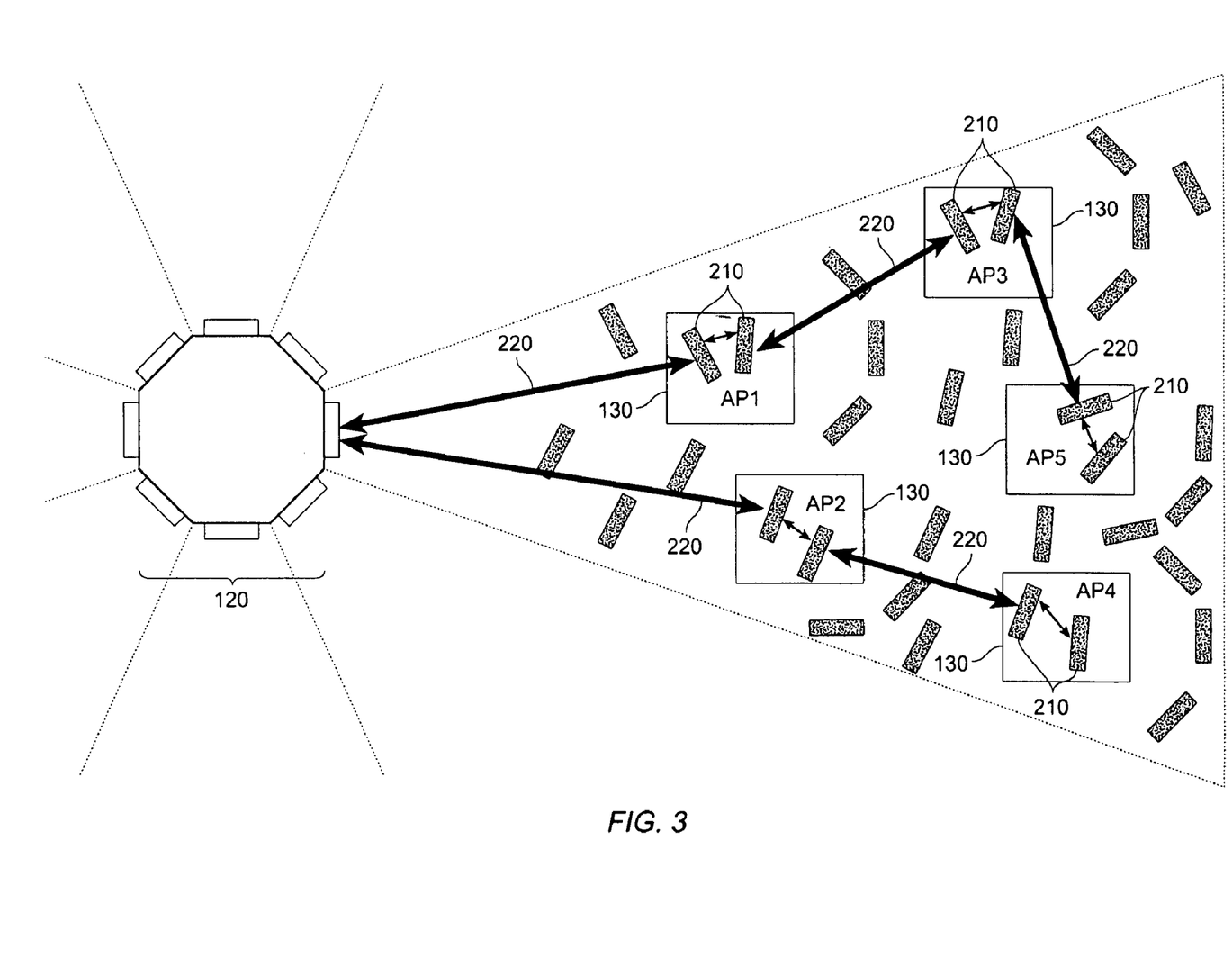
FIG. 3 shows a block diagram of a system including an integrated backhaul capability in a system with access points in a mesh network.

FIG. 3 shows a block diagram of a system including an integrated backhaul capability in a system with access points in a mesh network.

In a preferred embodiment, the access points 210 coupling an individual base station controller 120 a plurality of customer premises equipment 130 can include a mesh network 220, as described in the Incorporated Disclosures. The mesh network 220 includes a plurality of access points 210, each into communicating so as to deliver messages between the base station controller 120 and customer premises equipment 130. The mesh network 220 thus provides enhanced communication and enhanced connectivity between the base station controller 120 and customer premises equipment 130. The mesh network 220 thus also provides enhanced communication and enhanced connectivity between customer premises equipment 130 and non-wireless communication system 140.

In addition to providing enhanced communication and enhanced connectivity, the mesh network 220 is integrated into the backhaul capability of the wireless communication system 100. Thus, communication between customer premises equipment 130 and the non-wireless communication system 140 can include connectivity (between a base station controller 120 and one or more customer premises equipment 130) provided by the mesh network 220. Thus, in addition to allowing a base station controller 120 to communicate with customer premises equipment 130, the mesh network 220 also allows customer premises equipment 130 to communicate with non-wireless communication system 140, such as by means of one or more base station controllers 120.

Elements for QoS and Flow Management

Figure 4:
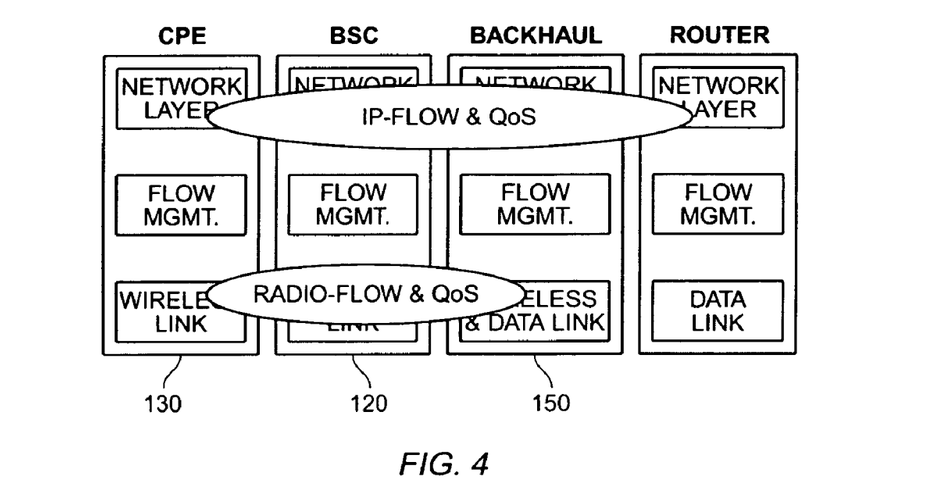
FIG. 4 shows a block diagram of a system including an integrated backhaul capability including QoS and flow management.

FIG. 4 shows a block diagram of a system including an integrated backhaul capability including QoS and flow management.

In a preferred embodiment, the system 100 provides for an integrated backhaul capability with wireless communication, including an entire communication path-way. Thus, the integrated backhaul capability includes customer premises equipment 130, base station controllers 120, backhaul capability elements (such as the communication link 150 between a selected base station controller 120 and the non-wireless communication system 140), and a router or switch coupled to the non-wireless communication system 140.

As shown in FIG. 4, base station controllers 120 adaptively adjust wireless communication, including both physical parameters and MAC parameters, for a substantial fraction of the entire communication pathway. This includes backhaul capability elements, base station controllers 120, and customer premises equipment 130. (In systems where access points 210 or a mesh network 220 of access points 210 are employed, this includes the access points 210 or the mesh network 220.) Adaptive adjustment of wireless communication causes the coupling of wireless link layers throughout the system 100, including backhaul capability elements, base station controllers 120, and customer premises equipment 130. As noted in the Incorporated Disclosures, adaptive adjustment of wireless communication includes adjustment of physical parameters and MAC parameters for wireless communication including base station controllers 120 and customer premises equipment 130.

Base station controllers 120 also adaptively adjust IP parameters, QoS (quality of service) parameters, and flow management parameters, also for substantial fraction of the entire communication pathway. This includes backhaul capability elements, base station controllers 120 and customer premises equipment 130.

Where applicable, base station controllers 120 also adaptively adjust IP parameters, QoS parameters, and flow management parameters, for communication including one or more routers or switches in the non-wireless communication system 140. Thus, base station controllers 120 can adjust communication between routers or switches in the non-wireless communication system 140 and all elements of the wireless communication system 100. This allows base station controllers 120 to optimize the integrated backhaul capability of the wireless communication system 100 with regard to parameters used at the IP layer of communication. Thus, adaptive adjustment of IP layer parameters causes the coupling of network layer elements throughout the system 100, including routers or switches, backhaul capability elements, base station controllers 120, and customer premises equipment 130.

Elements for QoS and Flow Management with Access Points

Figure 5:
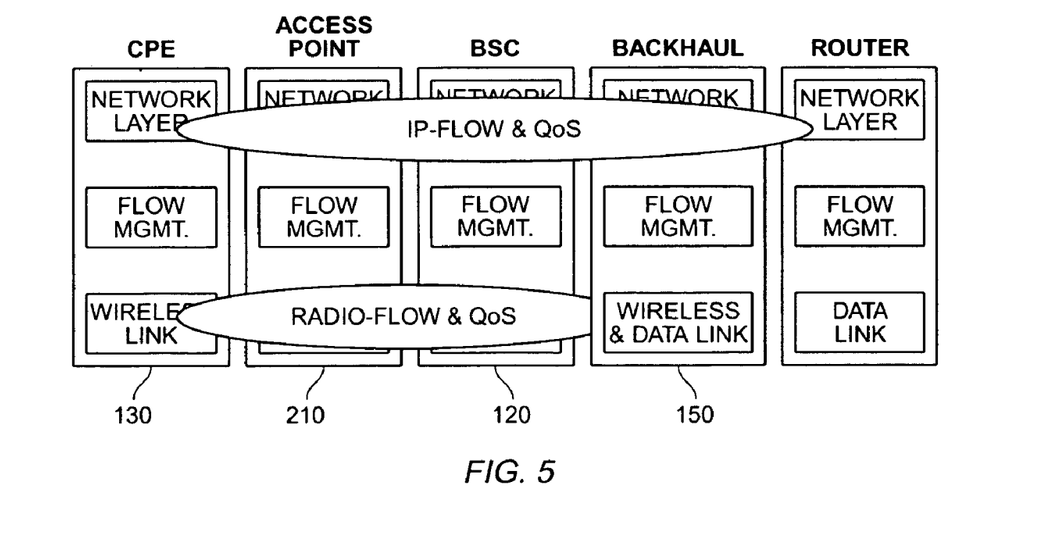
FIG. 5 shows a block diagram of a system including an integrated backhaul capability with QoS and flow management, using access points.

FIG. 5 shows a block diagram of a system including an integrated backhaul capability with QoS and flow management, using access points.

As shown in FIG. 5, base station controllers 120 also adaptively adjust wireless communication, including both physical parameters and MAC parameters, for substantial fraction of the entire communication pathway, when that communication pathway includes access points 210 or mesh networks 220. This includes those elements described with reference to FIG. 4, plus any access points 210 and mesh networks 220 of access points 210. Adaptive adjustment of wireless communication causes the coupling of wireless link layers throughout the system 100, including any access points 210 and mesh networks 220 of access points 210. As noted in the Incorporated Disclosures, adaptive adjustment of wireless communication includes adjustment physical parameters and MAC parameters for wireless communication including base station controllers 120, access points 210, and customer premises equipment 130.

Base station controllers 120 also adaptively adjust IP parameters, QoS parameters, and flow management parameters, as described with regard to FIG. 4, for any access points 210 and any mesh networks 220 of access points 210. This also includes communication between routers or switches in the non-wireless communication system, as well as any access points 210 and any mesh network 220 of access points 210, so as to form a completely integrated wireless communication system 100 having integrated backhaul capability with a non-wireless communication system 140.

Generality of the Invention

The invention has general applicability to various fields of use, not necessarily related to the services described above. For example, these fields of use can include one or more of, or some combination of, the following:

The invention is applicable to other forms of wireless communication, such as frequency division multiple access (FDMA) or code division multiple access (CDMA, also known as spread spectrum communication);

The invention is applicable to any non-wireless communication, in which relative effectiveness or efficiency of communication can be achieved from dynamically adjusting communication parameters, such as physical parameters or MAC parameters. For example, the invention can be generalized to non-wireless communication communication using modems in which equalization parameters are to be dynamically adjusted.

The invention is applicable to other wireless communication systems, such as satellite communication systems and (microwave tower or other) point to point transmission systems.

The invention is applicable to both fixed wireless communication systems, in which customer premises equipment do not move relative to the base station controller 120, and to mobile wireless communication systems, and which customer premises equipment move substantially relative to the base station controller 120.

Other and further applications of the invention in its most general form, will be clear to those skilled in the art after perusal of this application, and are within the scope and spirit of the invention.

Although preferred embodiments are disclosed herein, many variations are possible which remain within the concept, scope, and spirit of the invention, and these variations would become clear to those skilled in the art after perusal of this application.

What is claimed is:

1. A method, including steps of determining first values for a plurality of first parameters and at least one second parameter for a communication link, said first parameters being associated with a first layer of an OSI model communication system and said second parameter being associated with a second layer of an OSI model communication system;

sending first information using said first values for said communication link, said communication link being either an intracell communication link or an intercell communication link;

obtaining second information regarding characteristics of said communication link in response to a result of said steps of sending;

adjusting a plurality of said first values in conjunction in response to said second information, whereby further use of said communication link is responsive to said steps of adjusting;

performing said step of determining with regard to both a first communication link and a second communication link;

performing said step of sending with regard to both said first communication link and said second communication link;

performing said step of obtaining with regard to both said first communication link and said second communication link; and performing said step of adjusting in response to a result of said step of obtaining for each of said first communication link and said second communication link, whereby said step of adjusting is responsive to potential interference between communication on said first communication link and said second communication link.

2. A method as in claim 1, wherein
said first communication link includes either an intracell communication link or an intercell communication link; and
said second communication link includes an intercell communication link.

3. A method as in claim 1, wherein said steps of adjusting include using a first hysteresis link parameter with regard to said first communication link and a second hysteresis link parameter with regard to said second communication link.

4. Apparatus including
means for determining first values for a plurality of first parameters and at least one second parameter for a communication link, said first parameters being associated with a first layer of an OSI model communication system and said second parameter being associated with a second layer of an OSI model communication system;
means for sending first information using said first values for said communication link, said communication link being either an intracell communication link or an intercell communication link;
means for obtaining second information regarding characteristics of said communication link in response to a result of said steps of sending; and
means for adjusting a plurality of said first values in conjunction in response to said second information, whereby further use of said communication link is responsive to said steps of adjusting; wherein:
said means for determining is coupled to both a first communication link and a second communication link;
said means for sending is coupled to both said first communication link and said second communication link;
said means for obtaining is coupled to both said first communication link and said second communication link;
said means for adjusting is coupled to an output of said means for obtaining for each of said first communication link and said second communication link, said means for adjusting being responsive to potential interference between communication on said first communication link and said second communication link.

5. Apparatus as in claim 4, wherein
said first communication link includes either an intracell communication link or an intercell communication link; and
said second communication link includes an intercell communication link.

6. Apparatus as in claim 4, wherein said means for adjusting include a first hysteresis link parameter with regard to said first communication link and a second hysteresis link parameter with regard to said second communication link.

7. Apparatus including
at least one base station controller configured for determining first values for a plurality of first parameters and at least one second parameter for a first communication link, said first parameters of said first communication link being associated with a first layer of an OSI model communication system and said second parameter of said first communication link being associated with a second layer of an OSI model communication system;
said base station controller being configured for sending first information using said first values for said first communication link, said first communication link being either an intracell communication link or an intercell communication link;
said base station controller being configured for obtaining second information regarding characteristics of said first communication link, after sending the first information using said first values; and
said base station controller being configured for adjusting a plurality of said first values in conjunction in response to said second information, whereby further communication over said first communication link uses said first values adjusted by the base station controller.

8. Apparatus as in claim 7, wherein
said base station controller is configured for determining second values for a plurality of first parameters and at least one second parameter for a second communication link, said first parameters of said second communication link being associated with a first layer of an OSI model communication system and said second parameter of said second communication link being associated with a second layer of an OSI model communication system;
said base station controller is configured for communicating over said second link using said second values for said second communication link;
said base station controller configured for of independently controlling the first parameters and said second parameters for both said first communication link and said second communication link, in response to potential interference between communication on said first communication link and said second communication link.

9. Apparatus as in claim 8, wherein
said first communication link includes either an intracell communication link or an intercell communication link; and
said second communication link includes an intercell communication link.

10. Apparatus as in claim 8, wherein said means for adjusting include a first hysteresis link parameter with regard to said first communication link and a second hysteresis link parameter with regard to said second communication link.

11. A method, comprising steps of:
determining first values for a plurality of first parameters and at least one second parameter for a communication link, said first parameters being associated with a first layer of an OSI model communication system and said second parameter being associated with a second layer of an OSI model communication system;
sending first information using said first values for said communication link, said communication link being either an intracell communication link or an intercell communication link;
obtaining second information regarding characteristics of said communication link in response to a result of said steps of sending; and
adjusting a plurality of said first values in conjunction in response to said second information, whereby further use of said communication link is responsive to said steps of adjusting;
wherein the communication link comprises:
a wireless connection between a base station controller and customer premises equipment; and
a backhaul connection between the base station controller and a non-wireless communication system; and wherein the plurality of adjusted first values comprises a value of at least one of the first parameters and a value of the second parameter.

12. A method, including steps of determining first values for a plurality of first parameters and at least one second parameter for a communication link, said first parameters being associated with a first layer of an OSI model communication system and said second parameter being associated with a second layer of an OSI model communication system;

sending first information using said first values for said communication link, said communication link being either an intracell communication link or an intercell communication link;

obtaining second information regarding characteristics of said communication link in response to a result of said steps of sending; and adjusting a plurality of said first values in conjunction in response to said second information, whereby further use of said communication link is responsive to said steps of adjusting;

wherein said step of obtaining comprises sensing an effect selected from the group consisting of fading and multipath effects; and wherein the plurality of adjusted first values comprises a value of at least one of the first parameters and a value of the second parameter.

13. A method as in claim 12, wherein said step of obtaining comprises a step of sensing fading.

14. A method as in claim 12, wherein said step of obtaining comprises a step of sensing multipath effects.

15. A method, including steps of determining first values for a plurality of first parameters and at least one second parameter for a communication link, said first parameters being associated with a first layer of an OSI model communication system and said second parameter being associated with a second layer of an OSI model communication system;

sending first information using said first values for said communication link, said communication link being either an intracell communication link or an intercell communication link;

obtaining second information regarding characteristics of said communication link in response to a result of said steps of sending; and adjusting a plurality of said first values in conjunction in response to said second information, whereby further use of said communication link is responsive to said steps of adjusting;

wherein the plurality of first values comprises a value selected from the group consisting of a value of an antenna selection parameter, a value of a modulation type parameter, a value of a symbol rate parameter, a value of an error code parameter, a value of an equalization parameter, a value of a TDD duty cycle parameter, a number of message retransmission attempts over the communication link, a frequency of acknowledgement messages transmitted over the communication link, a symbol transmission rate of the communication link, a number of payload data bits assigned per symbol transmitted over the communication link, a number of error detection/correction bits assigned per symbol transmitted over the communication link, a number of payload data bytes assigned per message transmitted over the communication link, and a fraction of the communication link allocated to downstream communication.

16. A method as in claim 15, wherein the plurality of first values comprises a value of an antenna selection parameter.

17. A method as in claim 15, wherein the plurality of first values comprises a value of a modulation type parameter.

18. A method as in claim 15, wherein the plurality of first values comprises a value of a symbol rate parameter.

19. A method as in claim 15, wherein the plurality of first values comprises a value of an error code parameter.

20. A method as in claim 15, wherein the plurality of first values comprises a value of an equalization parameter.

21. A method as in claim 15, wherein the plurality of first values comprises a value of a TDD duty cycle parameter.

22. A method as in claim 15, wherein the plurality of first values comprises a number of message retransmission attempts over the communication link.

23. A method as in claim 15, wherein the plurality of first values comprises a frequency of acknowledgement messages transmitted over the communication link.

24. A method as in claim 15, wherein the plurality of first values comprises a symbol transmission rate of the communication link.

25. A method as in claim 15, wherein the plurality of first values comprises a number of payload data bits assigned per symbol transmitted over the communication link.

26. A method as in claim 15, wherein the plurality of first values comprises a number of error detection/correction bits assigned per symbol transmitted over the communication link.

27. A method as in claim 15, wherein the plurality of first values comprises a number of payload data bytes assigned per message transmitted over the communication link.

28. A method as in claim 15, wherein the plurality of first values comprises a fraction of the communication link allocated to downstream communication.

* * * * *